United States Patent
Dotan et al.

(10) Patent No.: US 11,289,973 B2
(45) Date of Patent: Mar. 29, 2022

(54) BOREHOLE PUMP AND METHOD OF USING THE SAME

(71) Applicant: Comet-ME Ltd., Jerusalem (IL)

(72) Inventors: Noam Dotan, Givat Yeshayahu (IL); Elad Orian, Jerusalem (IL); Ryan Melville Whillier Brand, Hubley (CA)

(73) Assignee: Comet-ME Ltd., Jerusalem (IL)

( * ) Notice: Subject to any disclaimer, the term of this patent is extended or adjusted under 35 U.S.C. 154(b) by 0 days.

(21) Appl. No.: 16/984,211

(22) Filed: Aug. 4, 2020

(65) Prior Publication Data
US 2020/0362848 A1    Nov. 19, 2020

Related U.S. Application Data

(63) Continuation of application No. 15/883,139, filed on Jan. 30, 2018, now Pat. No. 10,753,355.

(51) Int. Cl.
*E21B 43/12* (2006.01)
*F04B 47/06* (2006.01)
(Continued)

(52) U.S. Cl.
CPC .............. *H02K 7/14* (2013.01); *E21B 43/128* (2013.01); *F04B 47/06* (2013.01); *F04B 49/06* (2013.01);
(Continued)

(58) Field of Classification Search
CPC ........ E21B 43/128; F04B 17/03; F04B 19/22; F04B 47/06; F04B 49/06; F04B 49/12; F04B 53/1037; F04B 53/20; F04B 17/048; F04B 53/1047; H02K 5/132; H02K 7/14; H02P 29/40; H02S 10/20
See application file for complete search history.

(56) References Cited

U.S. PATENT DOCUMENTS 2,472,647 A * 6/1949 Covins ................ F04B 27/02
74/49
4,102,609 A    7/1978 Wood
(Continued)

FOREIGN PATENT DOCUMENTS

CA    2450707    5/2011
CN    2763575    3/2006
(Continued)

OTHER PUBLICATIONS

International Preliminary Report on Patentability dated Aug. 13, 2020 From the International Bureau of WIPO Re. Application No. PCT/IL2019/050117. (9 Pages).
(Continued)

*Primary Examiner* — Daniel P Stephenson

(57) ABSTRACT

A pump system for pumping liquid from a well into a pipe is disclosed. The pump system comprises: a suction cavity in fluid communication with the well via an inlet port controlled by an inlet port valve, a plunger, reciprocally movable within the suction cavity, and a delivery conduit. The delivery conduit is in fluid communication with the pipe via an outlet port, and with the suction cavity via a connection port controlled by a connection port valve. The pump system also comprises a tubular encapsulation, encapsulating the suction cavity, the plunger, the delivery conduit and the valves.

19 Claims, 6 Drawing Sheets

(51) Int. Cl.
*F04B 49/06* (2006.01)
*F04B 49/12* (2006.01)
*H02K 5/132* (2006.01)
*H02K 7/14* (2006.01)
*H02P 29/40* (2016.01)
*H02S 10/20* (2014.01)
*F04B 53/20* (2006.01)
*F04B 53/10* (2006.01)
*F04B 19/22* (2006.01)
*F04B 17/03* (2006.01)

(52) U.S. Cl.
CPC ............ *F04B 49/12* (2013.01); *H02K 5/132* (2013.01); *H02P 29/40* (2016.02); *H02S 10/20* (2014.12); *F04B 17/03* (2013.01); *F04B 19/22* (2013.01); *F04B 53/1037* (2013.01); *F04B 53/20* (2013.01)

(56) References Cited

U.S. PATENT DOCUMENTS

| | | |
|---|---|---|
| 4,272,226 A | 6/1981 | Osborne |
| 4,403,919 A | 9/1983 | Stanton et al. |
| 4,541,787 A | 9/1985 | DeLong |
| 4,611,974 A | 9/1986 | Holland |
| 4,778,356 A * | 10/1988 | Hicks .................... F04B 43/026 417/397 |
| 6,068,448 A | 5/2000 | Muratsubaki et al. |
| 6,203,288 B1 | 3/2001 | Kottke |
| 6,904,973 B2 | 6/2005 | Tieben |
| 7,380,608 B2 | 6/2008 | Geier |
| 10,309,381 B2 | 6/2019 | DeArman et al. |
| 10,753,355 B2 * | 8/2020 | Dotan .................... H02K 7/14 |
| 2002/0004014 A1 | 1/2002 | Kohl et al. |
| 2006/0266526 A1 | 11/2006 | Ocalan et al. |
| 2010/0329893 A1 | 12/2010 | Martinez et al. |
| 2012/0093663 A1 | 4/2012 | Foster |
| 2012/0244018 A1 | 9/2012 | Reilly |
| 2015/0176574 A1 | 6/2015 | DeArman et al. |
| 2015/0308244 A1 | 10/2015 | Cardamone et al. |
| 2018/0230992 A1 | 8/2018 | Shanks |
| 2019/0040858 A1 | 2/2019 | Khachaturov |
| 2019/0234395 A1 | 8/2019 | Dotan et al. |
| 2020/0362848 A1 * | 11/2020 | Dotan .................... H02K 5/132 |

FOREIGN PATENT DOCUMENTS

| | | |
|---|---|---|
| CN | 1798901 | 7/2006 |
| CN | 201250771 | 6/2009 |
| CN | 202579123 | 12/2012 |
| CN | 106194857 | 12/2016 |
| CN | 107614870 | 1/2018 |
| FR | 2385911 | 10/1978 |
| WO | WO2016/142928 | 9/2016 |
| WO | WO 2019/150364 | 8/2019 |

OTHER PUBLICATIONS

International Search Report and the Written Opinion dated May 12, 2019 From the International Searching Authority Re. Application No. PCT/IL2019/050117. (16 Pages).
Official Action dated Jan. 8, 2020 From the US Patent and Trademark Office Re. U.S. Appl. No. 15/883,139. (14 pages).
Translation Dated Aug. 23, 2021 of Notification of Office Action dated Jul. 30, 2021 From the State Intellectual Property Office of the People's Republic of China Re. Application No. 201980009115.8. (9 Pages).

* cited by examiner

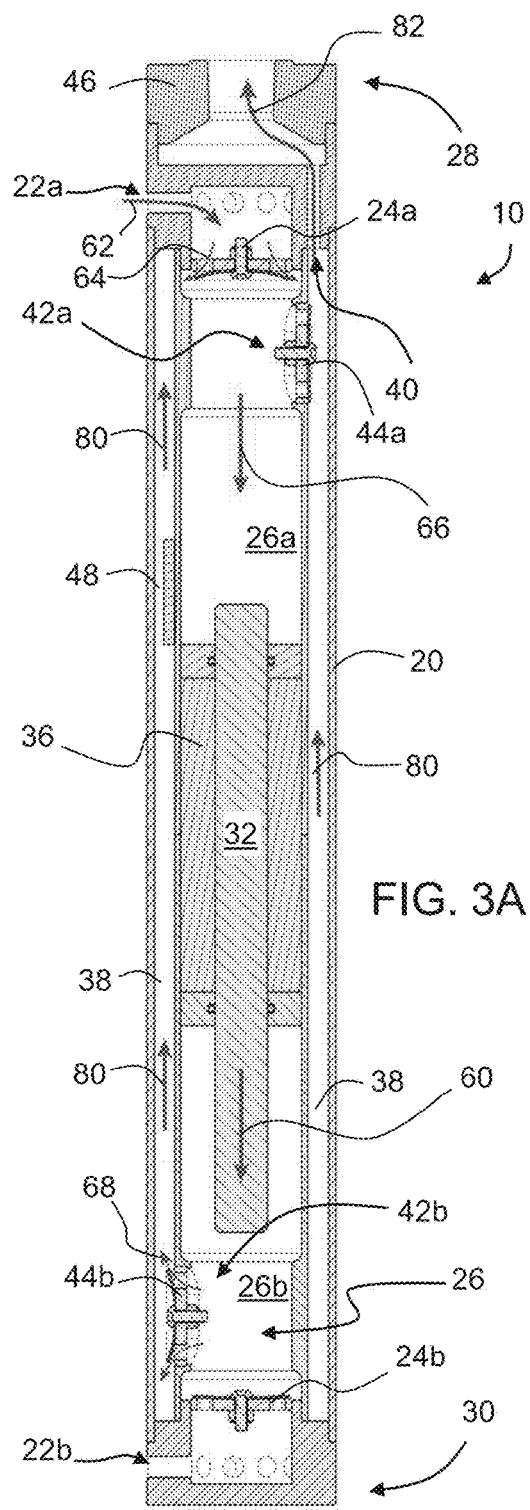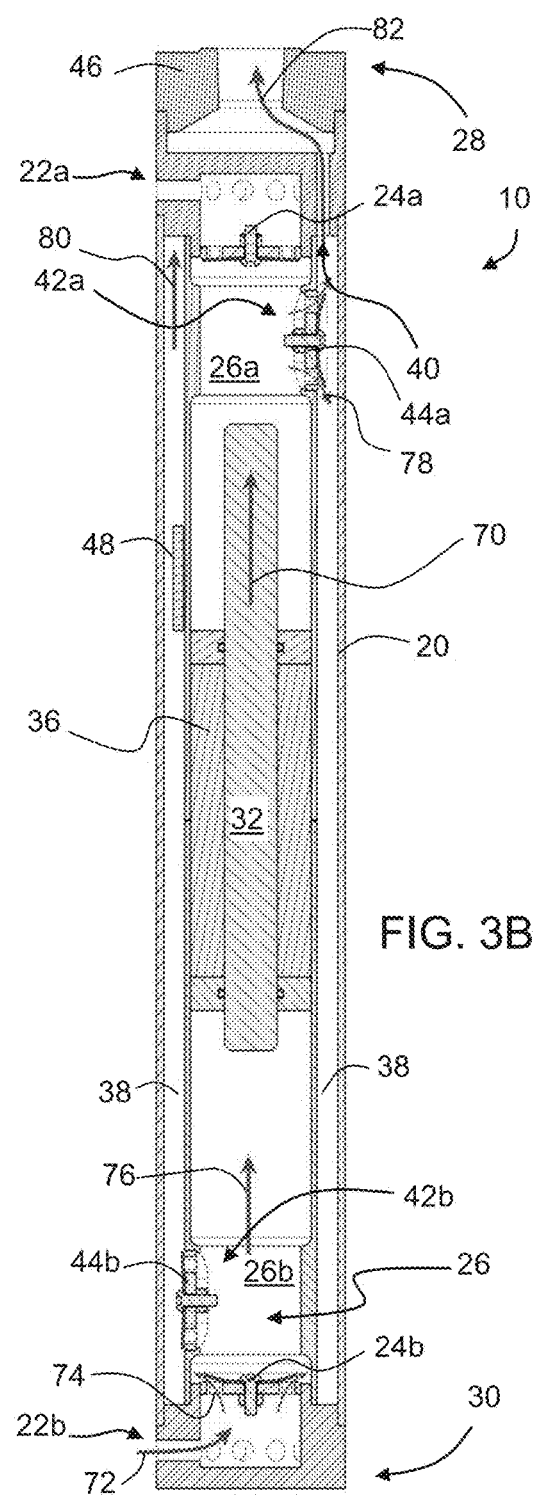

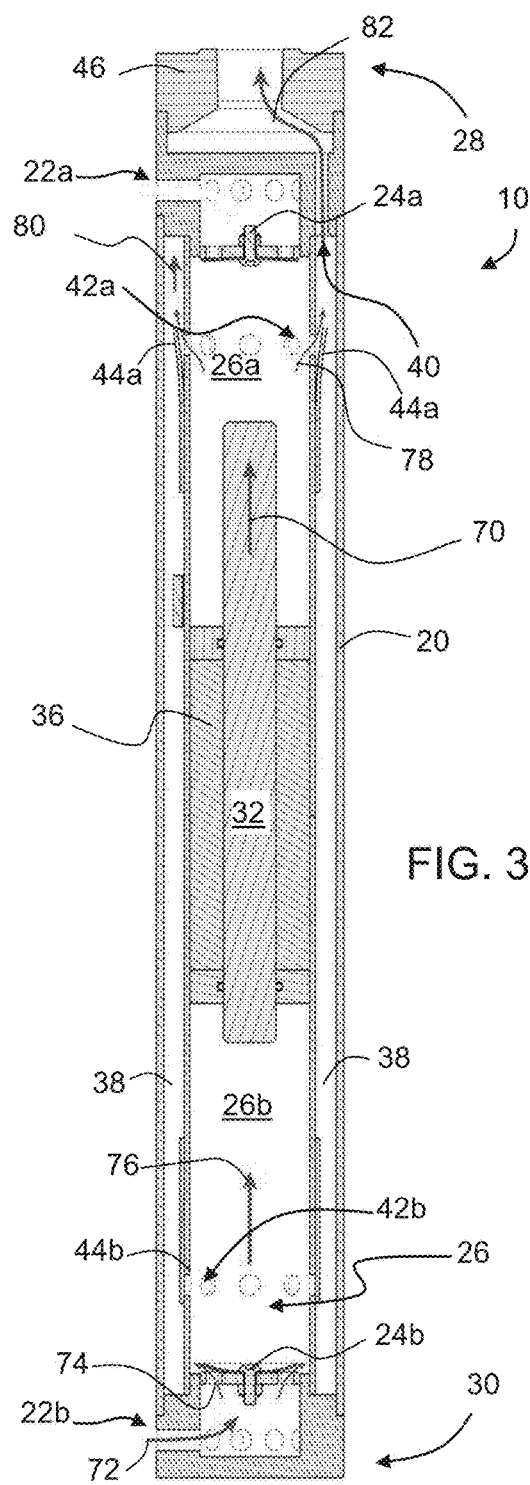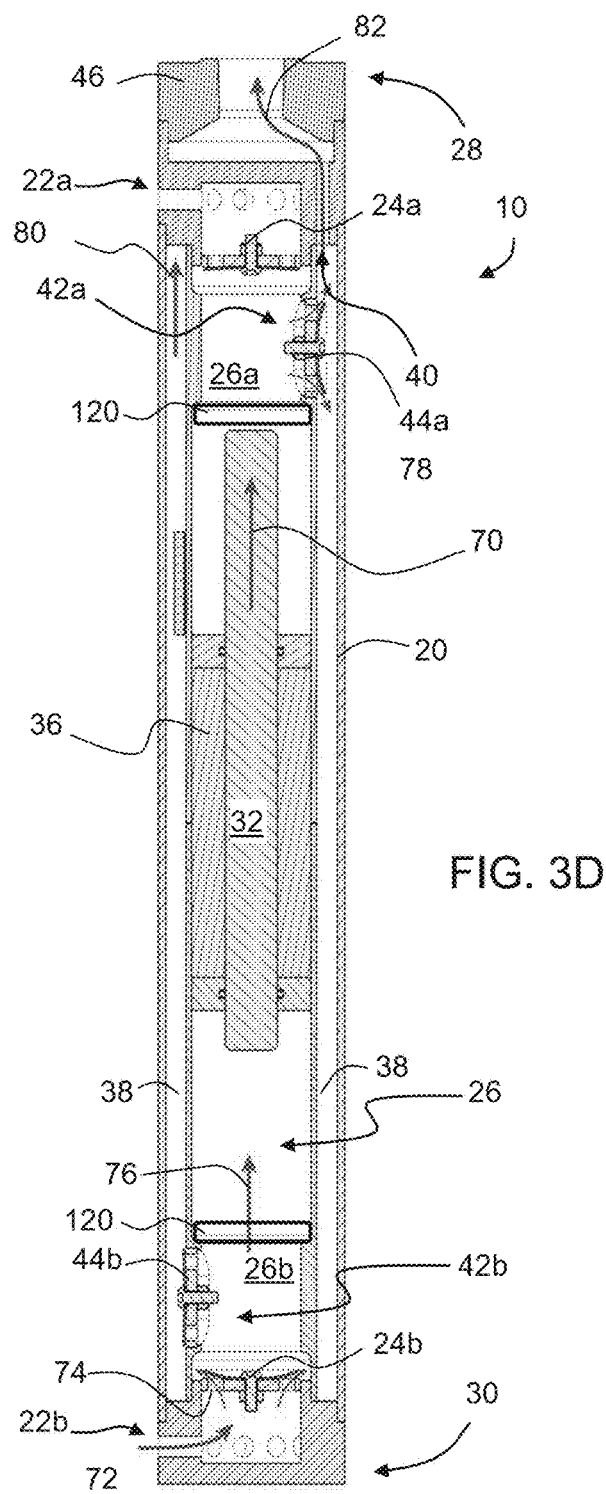

BOREHOLE PUMP AND METHOD OF USING THE SAME

RELATED APPLICATION

This application is a Continuation of U.S. patent application Ser. No. 15/883,139 filed on Jan. 30, 2018. The contents of the above application are all incorporated by reference as if fully set forth herein in their entirety.

FIELD AND BACKGROUND OF THE INVENTION

The present invention, in some embodiments thereof, relates to a pump and, more particularly, but not exclusively, to a borehole pump and method of using the same.

The need for shallow aquifer pumping increased dramatically over the past decades. Known in the art are solar pumps of the centrifugal or helical type. Also known are piston pumps, oftentimes referred to in the literature as reciprocating pumps. A conventional reciprocating pump typically uses an externally driven rod that actuates the piston linear stroke motion inside the submersed pump while the rod itself is connected to a crank shaft mechanism or a linear motor above the ground.

Of particular interest is a double action piston pump that pumps the water in both stroke directions, and therefore allows doubling the flow rate for approximately the same input power. U.S. Pat. No. 2,472,647 describes a double action reciprocating pump in which the piston is driven internally by a crank shaft, and U.S. Pat. No. 4,541,787 describes a double action piston pump that is driven by electromagnetic motor.

U.S. Pat. No. 4,778,356 discloses a double action diaphragm type pump with oppositely positioned diaphragm pumping units that are reciprocally operated by a hydraulic cylinder positioned between them. Separate opposite pistons operate the pumping units.

U.S. Published Application No. 20130195702 discloses a pump including a two-stepped cylinder with cavities and a lower intake valve. A hollow plunger is connected to a hollow rod and has a lower discharge valve and a through-hole via which the plunger cavity communicates with a chamber formed as the plunger moves.

Additional background art includes, U.S. Pat. Nos. 5,960,875, 6,015,270, 6,203,288, 7,445,435, European Application No. 1 018 601, and P. Andrada and J. Castro "Solar photovoltaic water pumping system using a new linear actuator" Renewable Energies and Power Quality Journal—RE&PQJ, Vol. 1, No. 5, 2007.

SUMMARY OF THE INVENTION

According to an aspect of some embodiments of the present invention there is provided a pump system for pumping liquid from a well into a pipe. The system comprises: a suction cavity in fluid communication with the well via an inlet port controlled by an inlet port valve, a plunger, reciprocally movable within the suction cavity along an axis, a delivery conduit, in fluid communication with the pipe via an outlet port, and with the suction cavity via a connection port controlled by a connection port valve reciprocally movable generally perpendicularly to the axis, a tubular encapsulation, encapsulating the suction cavity, the plunger, the delivery conduit and the valves.

According to an aspect of some embodiments of the present invention there is provided a pump system for pumping liquid from a well into a pipe. The system comprises: a suction cavity in fluid communication with the well via an inlet port formed in a valve body of an inlet port valve and being controlled by a movable sealing member of the inlet port valve, a plunger, reciprocally movable within the suction cavity along an axis, a delivery conduit, in fluid communication with the pipe via an outlet port formed in the valve body of the inlet port valve, and with the suction cavity via a connection port controlled by a sealing member of a connection port valve; a tubular encapsulation, encapsulating the suction cavity, the plunger, the delivery conduit and the valves.

According to some embodiments of the invention the inlet port is radial with respect to the valve body, and the outlet port is axial with respect to the valve body.

According to an aspect of some embodiments of the present invention there is provided a pump system for pumping liquid from a well into a pipe. The system comprises: a suction cavity in fluid communication with the well via an inlet ports controlled by an inlet port valves, a plunger, reciprocally movable within the suction cavity along an axis, a delivery conduit, in fluid communication with the pipe via an outlet port, and with the suction cavity via a connection ports controlled by a connection port valves, wherein the inlet ports and the connection port valves are arranged to provide double action pumping, a tubular encapsulation having a diameter from about 8 cm to about 20 cm, encapsulating the suction cavity, the plunger, the delivery conduit and the valves.

According to an aspect of some embodiments of the present invention there is provided a method of pumping. The method comprises introducing a pump system into a well, and operating the pump system so as to pump liquid from the well to a pipe, wherein the pump system comprises the system as delineated above and optionally and preferably as further detailed below, and wherein the well has a borehole diameter larger than a diameter of the tubular encapsulation.

According to some embodiments of the invention the borehole diameter is less than 25 cm.

According to some embodiments of the invention the system comprises an internal motor within the tubular encapsulation for establishing a reciprocal motion of the plunger within the suction cavity along the axis.

According to some embodiments of the invention the internal motor divides the suction cavity into two sub-cavities of different volumes, wherein a volume of a cavity that is distal to the pipe is larger than volume of a cavity that is proximal to the pipe.

According to some embodiments of the invention the inlet port and the inlet port valve are at a distal end of the tubular encapsulation, and the connection port and the connection port valve is at a proximal end of the tubular encapsulation.

According to some embodiments of the invention the inlet port and the inlet port valve are at a proximal end of the tubular encapsulation, and the connection port and the connection port valve is at a distal end of the tubular encapsulation.

According to some embodiments of the invention the system comprises an inlet port and a respective inlet port valve at the proximal end, and a connection port and a respective connection port valve at the distal end, the inlet port and the connection port valves being arranged to provide double action pumping.

According to some embodiments of the invention the inlet port valve at the proximal end and the connection port valve at the distal end are constituted to open when the plunger moves toward the distal end, and wherein the inlet port valve at the distal end and the connection port valve at the proximal end are constituted to open when the plunger moves toward the proximal end.

According to some embodiments of the invention at least one of the valves is a flap valve. According to some embodiments of the invention at least one of the valves is a diaphragm valve. According to some embodiments of the invention the connection port valve is a flap valve, and the inlet port valve is a diaphragm valve. According to some embodiments of the invention each of the valves is a diaphragm valve.

According to some embodiments of the invention the diaphragm valve comprises a plate formed with a plurality of openings, and a diaphragm covering the openings.

According to some embodiments of the invention the system comprises sealing packs, mounted on the plunger to separate between the plunger and liquid in the cavity.

According to some embodiments of the invention the system comprises a solar energy harvesting system for powering the reciprocal motion of the plunger.

According to some embodiments of the invention the system comprises an energy storage device for storing energy harvested by the solar energy harvesting system.

According to some embodiments of the invention the system comprises a controller having a circuit configured for measuring an amount of energy stored in the energy storage device, and for releasing energy from the energy storage device to power the reciprocal motion of the plunger when the amount of energy is above a predetermined threshold.

According to some embodiments of the invention the predetermined threshold is selected sufficient to establish no more than 10 strokes of the plunger.

According to some embodiments of the invention the controller is configured to reduce an amount of energy released from the energy storage device when an amount energy harvested by the solar energy harvesting system is below a predetermined threshold.

According to some embodiments of the invention the system comprises a controller for controlling power supply to the reciprocal motion of the plunger.

According to some embodiments of the invention the controller is configured to reverse a motion direction of the plunger before the plunger completes a full stroke length.

According to some embodiments of the invention the controller is configured to temporarily terminate the power supply before the plunger completes a full stroke length.

According to some embodiments of the invention the controller is configured to dynamically vary a point at which the power supply is temporarily terminated.

According to some embodiments of the invention the controller comprises a circuit configured to determine a position and an average speed of the plunger, and is configured to repeat the dynamically variation until the average speed, at a predetermined position of the stroke, is below a predetermined threshold.

According to some embodiments of the invention the controller is configured to reverse a motion direction of the plunger if the average speed, at the predetermined position of the stroke, is not below the predetermined threshold.

According to an aspect of some embodiments of the present invention there is provided a valve system which comprises a valve body and a movable sealing member. The valve body is formed with an inlet port and an outlet port. The inlet port is controlled by the sealing member, and the outlet port is not controlled by the sealing member. The inlet port is radial with respect to the valve body, and the outlet port is axial with respect to the valve body. According to some embodiments of the invention the sealing member comprises a diaphragm.

According to an aspect of some embodiments of the present invention there is provided a method of controlling a double action reciprocating pump system. The pump system comprises a plunger and an electrical motor establishing reciprocal motion of the plunger. The method comprises reversing a motion direction of the plunger before the plunger completes a full stroke length.

According to some embodiments of the invention the method comprises temporarily terminating the power supply before the plunger completes the full stroke length.

According to some embodiments of the invention the method comprises dynamically varying a point along a stroke path of the plunger at which the power supply is temporarily terminated.

According to some embodiments of the invention the method comprises receiving from the pump system a signal pertaining to a position and an average speed of the plunger, and repeating the dynamical variation until the average speed, at a predetermined position of the plunger along the stroke path, is below a predetermined threshold.

According to some embodiments of the invention the method comprises reversing a motion direction of the plunger if the average speed, at the predetermined position along the stroke path, is not below the predetermined threshold.

According to an aspect of some embodiments of the present invention there is provided a controller for controlling a double action reciprocating pump system. The pump system comprises a plunger and an electrical motor establishing reciprocal motion of the plunger. The controller comprises a dedicated circuit configured for executing the method of controlling the double action reciprocating pump system as delineated above and optionally and preferably as further detailed below.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A-3D are schematic illustrations describing the operational principle of the pump system, according to some embodiments of the present invention;

DESCRIPTION OF SPECIFIC EMBODIMENTS OF THE INVENTION

Figure 1:
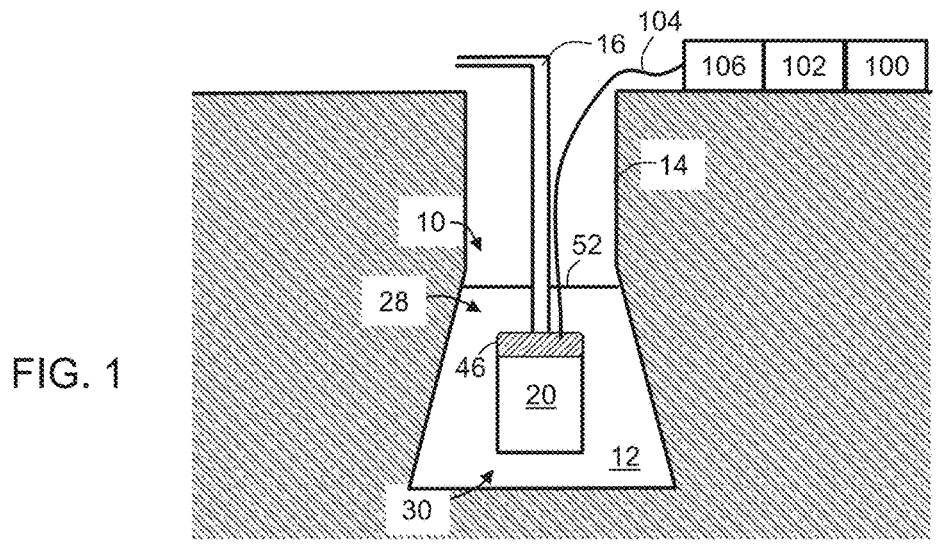
FIG. 1 is a schematic illustration of a deployment of a pump system within a well (e.g., an aquifer well), according to some embodiments of the present invention.

The present invention, in some embodiments thereof, relates to a pump and, more particularly, but not exclusively, to a borehole pump and method of using the same.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings FIG. 1 is a schematic illustration of a deployment of a pump system 10 within a well 14 (e.g., an aquifer well), according to some embodiments of the present invention. Pump system 10 serves for pumping liquid 12 (e.g., water) from well 14 into a pipe 16. From pipe 16 the pumped liquid is delivered to a consumer or a consumer system (not shown). System 10 preferably comprises a tubular encapsulation 20 having a proximal end 28 and a distal end 30. When system 10 is deployed within well 12, proximal end 28 is connected to pipe 16, e.g., via a connector 46, and distal end 30 is at a depth level that is below the depth level of proximal end 28. In use, at least distal end 30, but more preferably both ends 28 and 30, are submerged under the level 52 of liquid 12. Tubular encapsulation 20 can be made of any material that may be used under water without affecting both the water quality, and the encapsulation itself, such as, but not limited to, PVC, stainless steel and the like.

Pump system 10 is particularly useful for pumping liquid 12 from wells having a borehole diameter of from about 9 cm to about 25 cm, or from about 10 cm to about 20 cm (approximately equivalent to a borehole diameter of from about 4 inches to about 8 inches). In these preferred embodiments, tubular encapsulation 20 has a diameter from about 8 cm to about 24 cm, or from about 8 cm to about 19 cm, so as to fit into wells having such borehole diameters.

Preferably, pump system is a double action reciprocating pump system. In experiments performed by the present inventors, a double action reciprocating pump system constructed according to the teachings described herein was able to provide more than 2 cubic meters per hour, at pump head of about 30 meters.

Figure 2A:
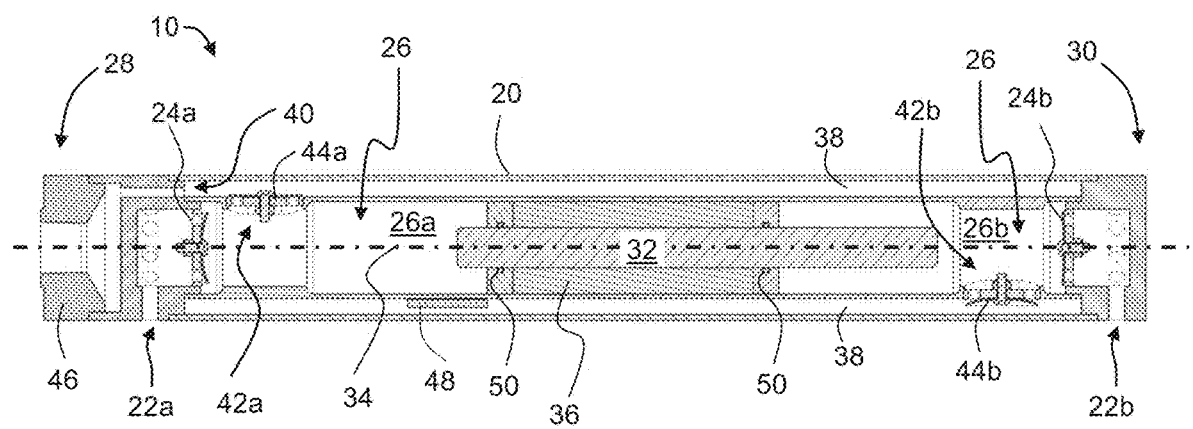
FIGS. 2A and 2B are schematic illustrations of the pump system in greater detail, according to some embodiments of the present invention.
Figure 2B:
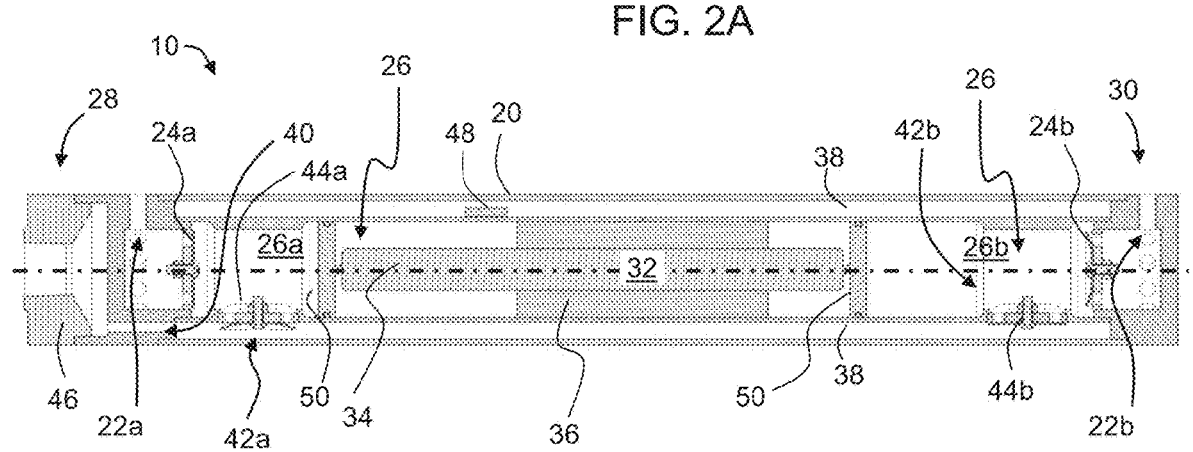

System 10 is illustrated in more details in FIGS. 2A-2B. System 10 preferably comprises a suction cavity 26 in fluid communication with the well (not shown in FIGS. 2A-2B, see FIG. 1) via one or more inlet ports 22a, 22b having respective one or more inlet port valves 24a, 24b. The inlet ports 22a, 22b may optionally and preferably be covered by a mesh screen (not shown), to filter out foreign objects such as sand grains and large sediments. The pore size of the mesh screen depends on the characteristics of the well. Typically, but not necessarily, the mesh screen prevents entry of particles greater than 100 micron in diameter from entering through the inlet ports.

Preferably, the inlet port valve(s) are of the check valve type (namely allow liquid pass only in one direction, which in the present embodiments is the inward direction into suction cavity 26). Shown in FIGS. 2A-2B, is a configuration with inlet port 22a and respective inlet port valve 24a at proximal end 28 of encapsulation 20, and inlet port 22b and respective inlet port valve 24b at distal end 30 of encapsulation 20. This configuration is particularly useful when system 10 provides double action pumping. Alternatively, system 10 can include one or more inlet ports and respective inlet port valves only at one end (e.g., distal end 30) of encapsulation 20. This configuration is particularly useful when system 10 provides a single action pumping.

System 10 further comprises a plunger 32, reciprocally movable within suction cavity 26 along a longitudinal axis 34 of encapsulation 20. The motion of plunger 32 is established by a motor 36, optionally and preferably electrical motor. Preferably, but not necessarily, motor 36 is an internal motor within encapsulation 20. In the illustration shown in FIGS. 2A-2B, which is not to be considered as limiting, motor 36, or its enclosure, divide cavity 26 into two sub-cavities 26a and 26b, one extending from motor 36 toward proximal end 28, and one extending from motor 36 toward distal end 30. Preferably, these sub-cavities are isolated from each other in the sense that there is no fluid communication between them. In some embodiments of the present invention sub-cavities 26a and 26b are provided as two separate elements each connected at the end of the motor 36. Motor 36 can be, for example, an electromagnetic linear tubular motor such as a motor marketed by Linmot®, Switzerland, or by Parker motors, USA, or a pneumatic motor, such as the pneumatic motor marketed by Tolomatic, USA, or the motor marketed by Dunkermotoren, Germany. Motor 36 is optionally and preferably a Brushless DC Motor.

In some embodiments of the present invention motor 36 comprises a position and/or velocity sensors 48 to monitor the position and speed of plunger 32.

Plunger 32 can move reciprocally on internal linear bearings (not shown) that may optionally and preferably be part of motor 36. Preferably, sealing packs 50 are provided to prevent flow of liquid along the plunger 32 into motor 36. This can be done in more than one way.

In one embodiment, illustrated in FIG. 2A, sealing packs 50 are provided on both sides of motor 36 to prevent flow of liquid along the plunger 32 into motor 36. The sealing pack is stationary so that the internal diameter of cavity 26 is optionally and preferably larger than the diameter of plunger 32.

In another embodiment, illustrated in FIG. 2B, sealing packs 50 are mounted on plunger 32 so as to seal between plunger 32 and cavity 26. In these embodiments, the sealing packs are not stationary as they move with plunger 32. Plunger 32 and sealing packs are optionally and preferably joint by a flexible mechanical joint. It was found by the inventors such a joint reduces radial forces on the bearings on which plunger 32 slides.

The embodiment illustrated in FIG. 2A is preferred from the standpoint of higher pump head, and the embodiment illustrated in FIG. 2B is preferred from the standpoint of higher flow rates. For example, in the embodiment illustrated in FIG. 2B the same motor arrangement but with a different diameter of cavity 26 can be employed to allow for higher volume of water to engage in the pump operation. When motor 36 or its enclosure divides cavity 26 into sub-cavities 26a and 26b, the dependence of the flow rate on the diameter of cavity 26 can optionally and preferably be utilized to provide different flow rates at different strokes of the plunger. In these embodiments, sub-cavities 26a and 26b have different diameters selected such that the sub-cavity that feeds pipe 16 (e.g., via conduit 38) during the phase in which plunger 32 moves downward has a larger diameter than the sub-cavity that feeds pipe 16 during the phase in which plunger 32 moves upward. The advantage of this embodiment is that is allows increasing the flow rate without substantially increasing the required energy supply, since during the downward motion of the plunger the force applied by motor is supplemented by the gravitational force, so that for the same amount of energy supplied by the motor higher amount of liquid can be pushed by the downward moving plunger.

Typically, the sub-cavity that is closer to distal end 30 (sub-cavity 26b, in the present example) feeds pipe 16 during the phase in which plunger 32 moves downward, and is therefore optionally and preferably made with larger diameter than the sub-cavity that is closer to proximal end 28 (sub-cavity 26a, in the present example).

In some embodiments of the present invention, system 10 comprises a pair of stopper elements 120 (not shown, see FIG. 3D) that limit the amplitude of the reciprocal motion of plunger 32 within cavity 26. Preferably, but not necessarily, the stopper elements are positioned within cavity 26 at locations selected such that at least part of plunger 32 protrudes out of the enclosure of motor 36 at all times. The stopper elements can be made elastic (e.g., provided as a spring or elastic plate such as, but not limited to, a polyethylene plate, a polycarbonate plate, a polyethylene terephthalate plate, or a rubber plate) so as to absorb the kinetic energy of the plunger in a retrievable manner, and push the plunger at the opposite direction, thereby reducing the energy required from motor 36 to initiate the reverse motion. The plunger can engage the stopper elements at the end of each stroke. Alternatively, the stopper elements can serve as emergency stoppers, in which case motor 36 reverses the motion of plunger 32 before it reaches stopper elements 120.

As will be explained below, suction cavity 26 receives the liquid 12 as a result of suction forces generated by the motion of plunger 32. Aside for suction cavity 26, system 10 can also comprise a delivery conduit 38. Preferably, delivery conduit 38 is within encapsulation 20. The advantage of this configuration is that it allows system 10 to fit into wells with relatively narrow borehole diameters (e.g., from about 4 inches to about 8 inches). In the representative embodiment illustrated in in FIG. 1 delivery conduit 38 is peripheral with respect to encapsulation 20 and is concentric with suction cavity 26. The advantage of having a peripheral delivery conduit is that it may aid in cooling motor 36 during the flow of liquid in delivery conduit 38, thereby allowing providing higher power input without the risk of motor overheating. Nevertheless, for some applications, it may not be necessary for delivery conduit 38 to be peripheral or concentric with suction cavity 26.

Delivery conduit 38 is in fluid communication with both pipe 16 (not shown in FIGS. 2A-2B, see FIG. 1) and suction cavity 26, thereby allowing conduit 38 to deliver the sucked liquid from cavity 26 to pipe 16. The fluid communication with pipe 16 is via one or more outlet ports 40, and the fluid communication with suction cavity 26 is via one or more connection ports 42a, 42b, having respective connection port valves 44a, 44b. Preferably, the connection port valve(s) are of the check valve type allowing liquid pass only in the outward direction with respect to suction cavity 26. In the preferred embodiment in which delivery conduit 38 is within encapsulation 20, the ports 40, 42a and 42b, and the valves 44a and 44b are also within encapsulation 20.

Shown in FIGS. 2A-2B, is a configuration with connection port 42a and respective connection port valve 44a at proximal end 28 of encapsulation 20, and connection port 42b and respective connection port valve 44b at distal end 30 of encapsulation 20. This configuration is particularly useful when system 10 provides double action pumping. Alternatively, system 10 can include one or more connection ports and respective connection port valves only at one end (e.g., proximal end 28) of encapsulation 20. This configuration is particularly useful when system 10 provides a single action pumping.

In some embodiments of the present invention at least one of valve(s) 44a and 44b includes a sealing member that is reciprocally movable generally perpendicularly to axis 34. In other words, the motions of the sealing members of the connection port valves are generally perpendicular to the motion of plunger 32. Thus, since plunger 32 moves axially along the longitudinal axis 34 of tubular encapsulation 20, the sealing members of connection port valves 44a, 44b move radially with respect to tubular encapsulation 20.

Any of valves 24a, 24b, 44a and 44b can be of any type suitable for serving as a check valve. In some embodiments of the present invention at least one of the valves is a flap valve, in some embodiments of the present invention at least one of valves is a diaphragm valve, and in some embodiments of the present invention at least one of the valves is a flap valve and at least one of valves is a diaphragm valve. For example, connection port valves 44a and 44b can be flap valves, and inlet port valves 24a and 24b can be a diaphragm valve. Alternatively, each of valves 24a, 24b, 44a and 44b can is a diaphragm valve. A representative example of a diaphragm valve suitable for use with any of valves 24a, 24b, 44a and 44b according to some embodiments of the present invention is described below with reference to FIGS. 5A-5D.

The operational principle of pump system 10 will now be explained with reference to FIGS. 3A-3D.

FIG. 3A illustrates a state of system 10 in a phase in which plunger 32 moves downward by motor 36 (toward distal end 30), as indicated by arrow 60. During motion, plunger 32 evacuates space in sub-cavity 26a resulting in formation of under-pressure within sub-cavity 26a, opening of valve 24a, and entry of liquid through port 22a, and then through valve 24a, as indicated by arrows 62 and 64, respectively. Thus, liquid enters 66 into sub-cavity 26a. The under-pressure in sub-cavity 26a ensures that valve 44a remains close. At the same time, plunger 32 also reduces the space sub-cavity 26b, resulting in over pressure within sub-cavity 26b, opening of valve 44b and allowing the liquid to exit through port 42b as indicated by arrow 68. The overpressure in sub-cavity 26b ensures that valve 24b remains close, so that the liquid does not exit back into the well through inlet port 22b. Since valve 44b is open into delivery conduit 38, there is also overpressure in delivery conduit 38, resulting in flow of liquid upward 80 within conduit 38. Since valve 44a remains close, the liquid flows toward outlet port 40 and into pipe 16 (not shown) as indicated by arrow 82, without entering into sub-cavity 26a through port 42a.

FIGS. 3B-3D illustrate a state of system 10 in a phase in which plunger 32 moves upward by motor 36 (toward distal end 30), as indicated by arrow 70. FIGS. 3B and 3D illustrate the state of system 10 in an embodiment in which each of valves 24a, 24b, 44a and 44b of system 10 is a diaphragm valve, and FIG. 3C illustrates the state of system 10 in an embodiment in which connection port valves 44a and 44b are flap valves, and inlet port valves 24a and 24b are diaphragm valves.

During motion, plunger 32 evacuates space in sub-cavity 26b resulting in under-pressure within sub-cavity 26b, opening of valve 24b, and entry of liquid through port 22b, as indicated by arrows 72 and 74, respectively. Thus, liquid enters 76 into sub-cavity 26b. The under-pressure in sub-cavity 26b ensures that valve 44b remains closed. At the same time, plunger 32 also reduces the space sub-cavity 26a, resulting in over pressure within sub-cavity 26a, opening of valve 44a and allowing the liquid to exit through port 42a as indicated by arrow 78. The overpressure in sub-cavity 26a ensures that valve 24a remains close, so that the liquid does not exit back into the well through inlet port 22a. Since valve 44a is open into delivery conduit 38, there is also overpressure in delivery conduit 38, resulting in flow of liquid within conduit 38 toward outlet port 40 and into pipe 16 (not shown) as indicated by arrow 82. Since valve 44b remains close, the liquid does not enter into sub-cavity 26a through port 42b.

FIGS. 3A-3D thus illustrate a double action pumping wherein the liquid enters system 10 from the well in both stroke directions of plunger 32. While FIG. 3C only shows the upward phase in the embodiment in which connection port valves 44a and 44b are flap valves, One of ordinary skills in the art, provided with the details described herein would understand the operational principle also for the downward phase in this embodiment.

Figure 4A:
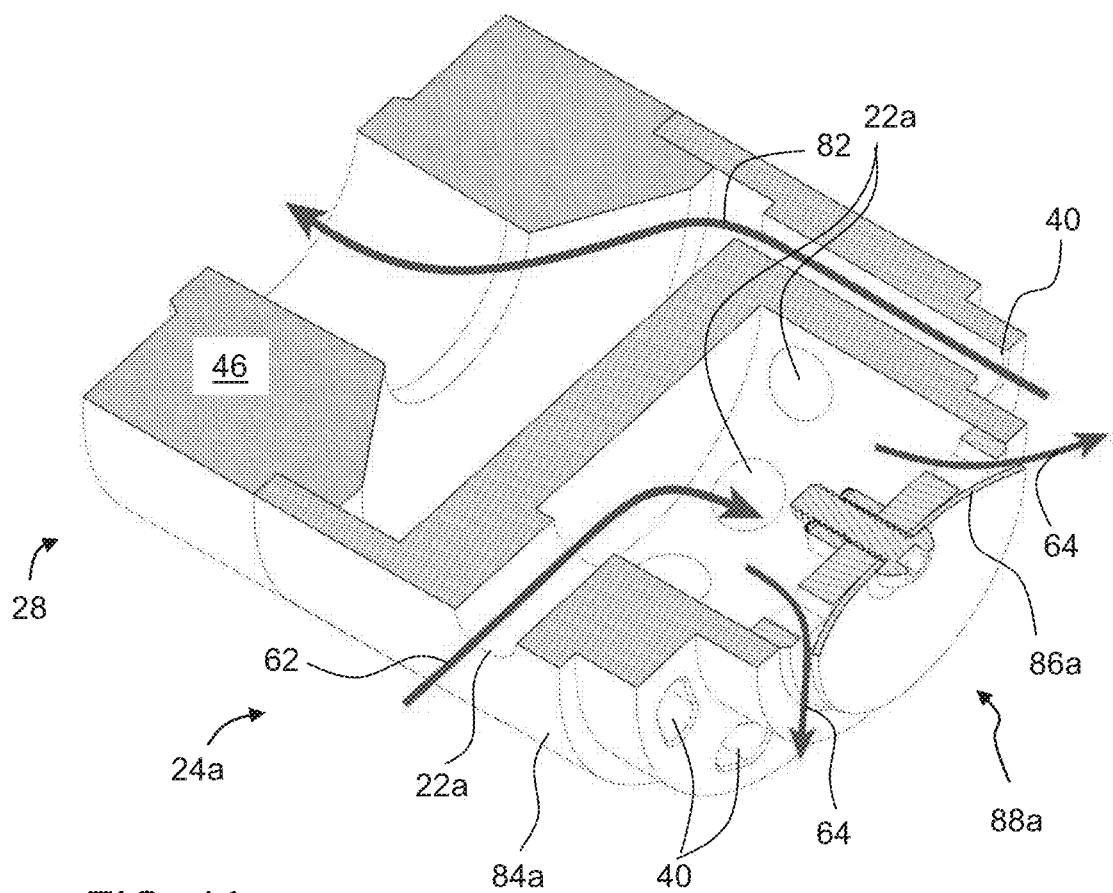
FIGS. 4A and 4B are schematic illustrations showing representative examples of valve systems, according to some embodiments of the present invention.
Figure 4B:
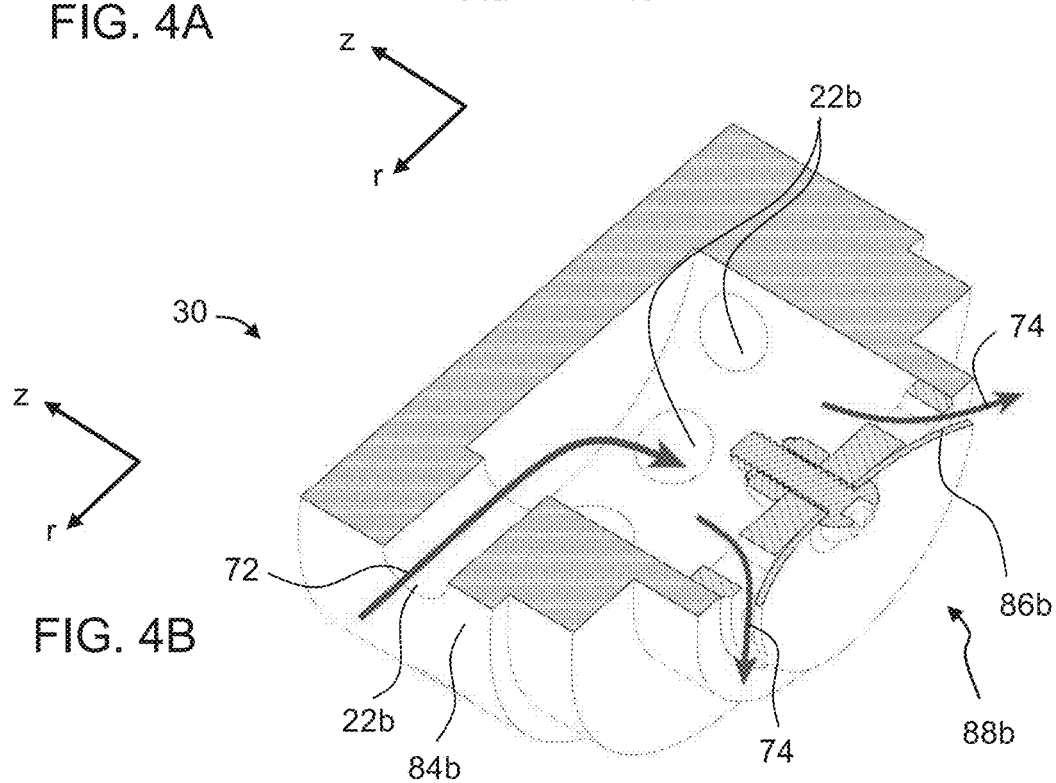
Figures 5A, 5B:
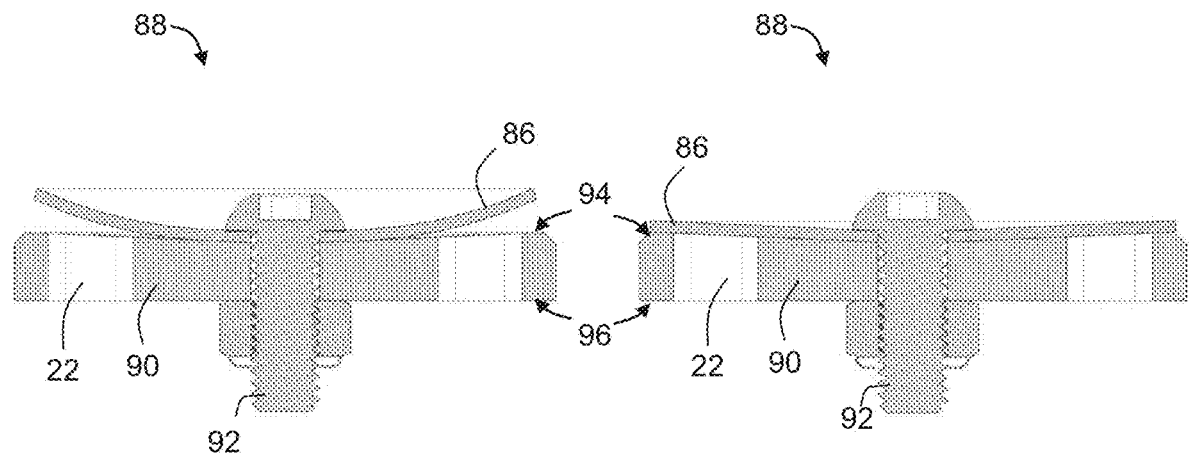
FIGS. 5A-5D are schematic illustrations of cross-sectional views (FIGS. 5A and 5B) and perspective views (FIGS. 5C and 5D) of a fluid control assembly of a diaphragm type valve, according to some embodiments of the present invention.
Figures 5C, 5D:
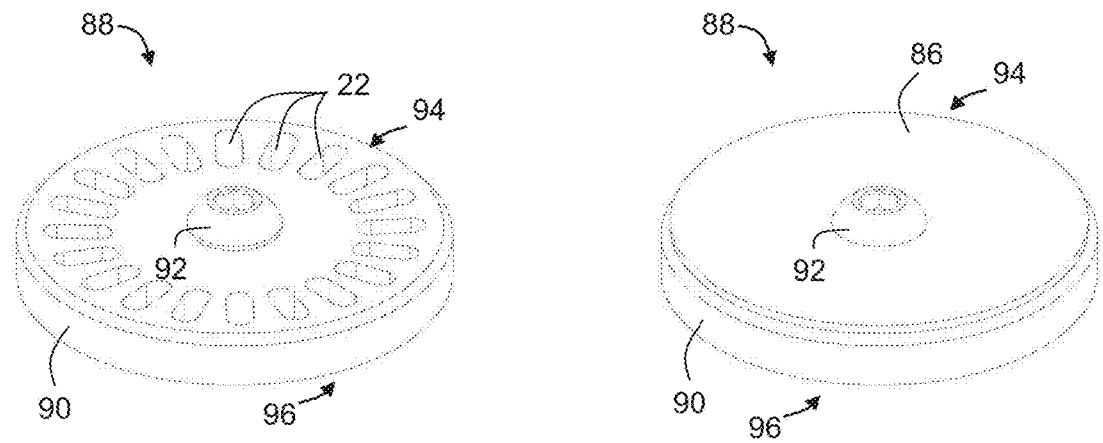

Representative examples of valve systems according to some embodiments of the present invention are illustrated in FIGS. 4A and 4B. The valve system illustrated in FIG. 4A is suitable for use as inlet port valve 24a at proximal end 28 of encapsulation 20, and the valve system illustrated in FIG. 4B is suitable for use as inlet port valve 24b at distal end 30 of encapsulation 20.

Referring to FIG. 4A, valve system 24a comprises a tubular valve body 84a and a fluid control assembly 88a having a movable sealing member 86a. Also shown in FIG. 4A is a cylindrical coordinate system having a radial coordinate r and an axial coordinate z. Valve body 84a preferably has an outer surface perpendicular to the radial coordinate r, and sealing member 86a is optionally and preferably movable along the axial coordinate. For example, valve body 84a can be cylindrical. When the valve system 24a is used in system 10, it is oriented such that axis 34 is along the axial coordinate z, and is coaxial with the symmetry axis of the valve system.

Valve body 84a is formed with one or more inlet ports, such as, but not limited to, inlet port 22a, which is controlled by sealing member 86a. Valve body 84a is also formed with one or more outlet ports, such as, but not limited to, outlet port 40, which is not controlled by sealing member 86a. Thus, liquid can flow through port(s) 22a only when sealing member 86a assumes an opened state as shown by arrow 64. On the other hand, liquid can flow through port(s) 40 irrespectively of the state of sealing member 86a. In the schematic illustration of FIG. 4A, which is not to be considered as limiting, sealing member 86a is shown as a diaphragm, but any other type of movable sealing member can be employed. Optionally and preferably, inlet port(s) 22a is radial with respect to valve body 84a, and outlet port(s) 40 is axial with respect to valve body 84a.

In use with system 10, the liquid enters through inlet ports 22a when sealing member 86a assumes its opened state, typically as a result of under-pressure formed in sub-cavity 26a as further detailed hereinabove. The total cross section area of ports 22a optionally and preferably selected to allow for the required volume of liquid to enter the suction cavity in at each stroke of the plunger. In some embodiments, this area is approximately equal to the cross sectional area of plunger 32. The liquid exits cavity 26 through outlet ports 40 that establish fluid communication with connector 46 and pipe 16 (not shown). Thus, the body 84a is structured to separate between the inlet and outlet ports.

Referring to FIG. 4B, valve system 24b can be similar in shape to valve system 24a, in the sense that it comprises a tubular valve body 84b and fluid control assembly 88b having a movable sealing member 86b, where the outer surface of valve body 84b preferably perpendicular to the radial coordinate r, and sealing member 86b is optionally and preferably movable along the axial coordinate z. Valve body 84b is optionally and preferably different from valve body 84a in that valve body 84b is formed with one or more inlet ports, such as, but not limited to, inlet port 22b, which is controlled by sealing member 86b, but is devoid of outlet ports, since the liquid optionally and preferably does not exit cavity 26 at distal end 30.

In use with system 10, the liquid enters through inlet ports 22b when sealing member 86b assumes its opened state, typically as a result of a an under-pressure formed in sub-cavity 26b. Similarly to FIG. 4A, the total cross section area of ports 22b is optionally and preferably selected to allow for the required volume of liquid to enter the suction cavity in at each stroke of the plunger. In some embodiments, this area is approximately equal to the cross sectional area of plunger 32. Since the liquid optionally and preferably does not exit cavity 26 at distal end 30, the body 84b does not need to separate between the inlet and outlet ports.

Thus, the present embodiments contemplate configurations in which valves 24a and 24b are not identical, wherein the body 84a includes both inlet and outlet ports separated from each other, while the body 84b includes only inlet ports.

FIGS. 5A-5D are schematic illustrations of cross-sectional views (FIGS. 5A and 5B) and perspective views (FIGS. 5C and 5D) of fluid control assembly 88 of a diaphragm type valve, that is suitable for use according to some embodiments of the present invention as fluid control assembly 88a and/or fluid control assembly 88b. Assembly 88 comprises sealing member 86, which in the present embodiment is a flexible diaphragm. The diaphragm can be made of any non-pours material that can provide sealing, including, without limitation, rubber, plastic, silicon and metal. Sealing member 86 is mounted, e.g., by a screw 92, to a front side 94 of a multi hole plate 90, wherein the holes 22 in plate 90 can serve as the inlet ports 22a and/or 22b. For clarity of presentation, FIG. 5C does not show sealing member 86. Plate 90 can be shaped as a disk producing preload forces that allow for efficient back flow seal.

In an opened state of the diaphragm (FIGS. 5A and 5C), e.g., as a result of an under-pressure at front side 94, the diaphragm can fold at its periphery to assume a dome shape thereby allowing flow of liquid through holes 22 in the direction from the back side 96 to the front side 94 of plate 90 (e.g., inwardly with respect to cavity 26, when assembly is used in system 10). The flow capacity of assembly 88 (hence also the inflow capacity of the respective valve system) depends on the total cross section area of holes 22 and the degree of the fold. In a closed state of the diaphragm (FIGS. 5B and 5D), e.g., as a result of an overpressure at front side 94, the diaphragm is tightly closing holes 22 in plate 90 to prevent back flow from front side 94 to back side 96. When the diaphragm is made of rubber, the number of holes is preferably large (e.g., from about 5 to about 50 or from about 15 to about 30 holes or slots arranged radially) to support the rubber and prevent the rubber from sinking into the holes 22 and being deformed. In some embodiments of the present invention the diaphragm is made of rubber that is internally reinforced with a supporting net, such as, but not limited to, a nylon fabric net. The multi holes plate 90 can be made of any material, such as, but not limited to, plastic and stainless steel, with stainless steel being preferred over plastic. Plate 90 is optionally and preferably sufficiently thin (e.g., from about 0.1 mm to about 10 mm or 1 mm to about 5 mm) to avoid contamination build up on the walls of holes 22. The advantage of assembly 88 is that it is relatively light weighted (e.g., the weight of diaphragm 86 can be from about 10 grams to about 80 grams or from about 20 grams to about 50 grams and low cost, and also has a fast response time (e.g., at least 3 or at least 5 or at least 8 or at least 10 cycles per second) and relatively long lifetime.

Referring again to FIG. 1, system 10 preferably comprises a power supply system 100, which is preferably, but not necessarily, a solar energy harvesting system, for powering motor 36 hence also the reciprocal motion of plunger 32. Power lines 104 can be connected to motor 36 to deliver energy thereto. In some embodiments of the present invention system 10 comprises an energy storage device 102 for storing energy, for example, in the form of electrical charge or electrical potential difference. This embodiment is particularly useful when system 100 is a solar energy harvesting system, in which case energy storage device 102 stores a portion the harvested energy. Energy storage device 102 can be of any type, including, without limitation, a capacitor, a supercapacitor or a battery, and can alternatively include a thermal mass for storing energy in the form of heat. System 100 and device 102 are optionally and preferably external with respect to encapsulation 20.

In various exemplary embodiments of the invention system 10 comprises a controller 106 having a circuit, preferably a dedicated circuit. Controller 106 is shown external to encapsulation 20, but need not necessarily be the case, since in some embodiments of the present invention controller is encapsulated in encapsulation 20.

Controller 106 is optionally and preferably configured for measuring the amount of energy stored in energy storage device 102, and for releasing energy from energy storage device 102 to power motor 36 when the amount of measured energy is above a predetermined threshold. This embodiment is particularly useful when energy storage device 102 stores a portion of the harvested solar energy. For example, at low light conditions, when system 100 harvests low amounts or no solar energy, controller 106 can use the stored energy for powering the motor. When the stored energy (e.g., in terms of the voltage on device 102) is at or below the threshold, controller 106 can reduce the extraction of energy from device 102, allowing the solar energy harvesting system 100 to rebuild the energy supply in device 102. Since pump system 10 pumps the liquid by means of the motion of plunger, it is sufficient to allow the plunger to move a small number of strokes and still pump liquid. This is unlike centrifugal or helical pumps that must operate at specific RPM to start pumping. According to some embodiments of the present invention the predetermined threshold is selected sufficient to establish no more than 10 strokes or less than 10 strokes or less than 8 strokes or less than 6 strokes or less than 4 strokes, e.g., 2 strokes or 1 stroke of plunger 32.

Controller 106 of system 10 can also be configured to control motor 36, for example, for ensuring efficient operation thereof. For example, in some embodiments of the present invention controller 106 reverses the motion direction of plunger 32 before plunger 32 completes a full stroke length. Preferably, the circuit of controller 106 is provided with electronic functionality that receives from sensor 48 (FIGS. 2A-2B) a signal pertaining to the position and/or speed of plunger 32, and calculates based on this signal the position of the plunger, wherein when the position of the plunger passes a predetermined point along the stroke path, controller 106 signals motor 36 to reverse the motion direction of the plunger.

In some embodiments of the present invention controller 106 temporarily terminates the power supply to motor 36 before plunger 32 completes a full stroke length. This allows exploiting the kinetic energy of the plunger instead of the power from system 100 or device 102 at the end portion of the plunger's stroke. Controller 106 can optionally and preferably dynamically vary the point along the stroke path at which the power supply is temporarily terminated. For example, based on the signal from sensor 48, controller 106 can determine the position and average speed of plunger 32. Controller 106 repeats the variation of the point at which the power supply is terminated until the average velocity of plunger 32 at a predetermined position $z_1$ along the stroke path is below a predetermined threshold $v_{limit}$. When the average velocity of plunger 32 at position $z_1$ is not below $v_{limit}$, controller 106 can optionally and preferably reverse the motion direction of plunger 32 at position $z_1$.

Figure 6:
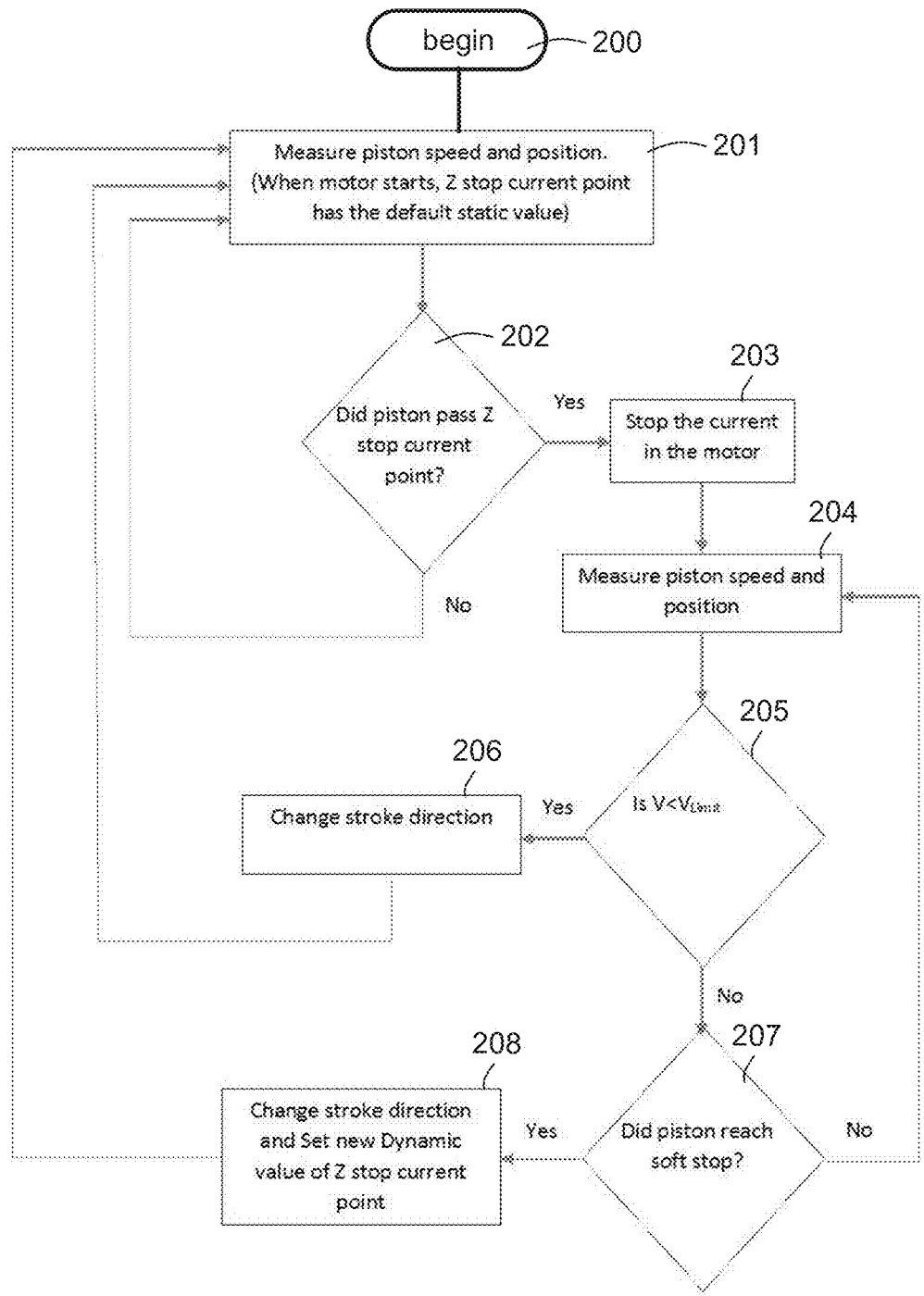
FIG. 6 is a flowchart diagram describing a method suitable for controlling a double action reciprocating pump system, according to various exemplary embodiments of the present invention.

FIG. 6 is a flowchart diagram describing a method suitable for controlling a double action reciprocating pump system, such as, but not limited to, system 10, according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method is optionally and preferably executed for reversing the motion direction of the plunger before the plunger completes a full stroke length. The method begins at 200 and optionally and preferably continues to 201 at which a signal pertaining to a position and an average speed of the plunger is received from the pump system. At the first execution of 201, the method loads (e.g., from a memory) a predetermined value of the position at which the motor is to be turned off. The method optionally and preferably continues to decision 202 at which the method determines whether or not the position of the plunger along its stroke path is at or beyond a position described by a positional parameter $z_{prev}$.

The parameter $z_{prev}$ is preferably updatable, and describes a point along the stroke path at which the power to the motor has been temporarily terminated in a previous execution iteration of the method. At a first execution iteration of the method, a predetermined value for $z_{prev}$ can be used.

If the position of the plunger along its stroke path is before the position described by $z_{prev}$, the method loops back to 201 to receive another signal from the pump system. If the position of the plunger along its stroke path is at or beyond the position described by $z_{prev}$, the method optionally and preferably proceeds to 203 at which the power to the motor is temporarily terminated. From 203 the method optionally and preferably continues to 204 at which another signal is received from the pump system to determine the position and average speed of the plunger in the absence of power to the motor.

From 204 the method optionally and preferably proceeds to decision 205 at which the method determines whether or not the average speed is less than the predetermined speed threshold $v_{limit}$. If the average speed is less than $v_{limit}$, the method proceeds to 206 at which the motion direction of the plunger is reversed, and then loops back to 201. If the average speed is not less than $v_{limit}$, the method optionally and preferably proceeds to decision 207 at which the method determines whether the position of the plunger is at or beyond the aforementioned predetermined position $z_1$.

The position $z_1$ can be described by a predetermined fixed software Parameter $z_{sw}$.

If the position of the plunger is at or beyond $z_1$, the method optionally and preferably proceeds to 208 at which the motion direction of the plunger is reversed and the value of $z_{prev}$ is updated to the current position of the plunger or to a predetermined vertical distance from the current position of the plunger. From 208 the method can loop back to 201. If the position of the plunger is before $z_1$, the method optionally and preferably loops back to 204 without reversing the motion direction of the plunger and without updating the value of $z_{prev}$. The method of the present embodiments thus repeats the dynamical variation of $z_{prev}$ until the average speed of the plunger at position $z_1$ (described by the parameter $z_{sw}$) is below $v_{limit}$. The inventors found that when the average speed of the plunger at position $z_1$ is below $v_{limit}$, the pump operate at improved efficiency, since the kinetic energy that the plunger acquires is additively supplemented to the energy provided by the external powering system.

Since the pump is typically vertical, the speed of plunger 32 is higher during the motion downward. Thus, the present embodiments contemplate different sets of threshold parameters for the up and down directions. When pump is operated by solar radiation, it may be that the plunger reaches lower speed than $v_{limit}$, before it reaches the $z_1$ point. This scenario can occur, for example, when and there is a drop in solar radiation (e.g., due to clouds or the like). In this case, the stroke range for which power is provided to the motor is increased.

Following are typical parameters that can be employed according to some embodiments of the present invention.

A typical diameter of plunger 32 is from about 0.9" to about 1.1", e.g., about 1". The total travel range of plunger 32 is from about 180 mm to about 220 mm, e.g., about 200 mm in each direction. The maximal stroke distance is typically the same as the total travel range of plunger 32. The typical inner diameter of cavity 26 is from about 26 mm to about 30 mm, e.g., about 28 mm. The maximal speed of plunger 32 is typically from about 1.5 to about 2.5 m/sec, depending on available input power.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral)

within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A pump system for pumping liquid from a well into a pipe, comprising:
   a suction cavity in fluid communication with the well via an inlet port formed in a valve body of an inlet port valve and being controlled by a movable sealing member of said inlet port valve,
   a plunger, reciprocally movable within said suction cavity along an axis,
   a delivery conduit, in fluid communication with the pipe via an outlet port formed in said valve body of said inlet port valve, and with said suction cavity via a connection port controlled by a sealing member of a connection port valve;
   a tubular encapsulation, encapsulating said suction cavity, said plunger, said delivery conduit and said valves;
   wherein said outlet port is not controlled by said sealing member, wherein said inlet port is radial with respect to said valve body, and wherein said outlet port is axial with respect to said valve body.

2. A method of pumping, comprising introducing a pump system into a well, and operating said pump system so as to pump liquid from said well to a pipe, wherein said pump system comprises the system according to claim 1, and wherein said well has a borehole diameter larger than a diameter of said tubular encapsulation.

3. The method according to claim 2, wherein said borehole diameter is less than 25 cm.

4. The system according to claim 1, wherein the system comprises an internal motor within said tubular encapsulation for establishing a reciprocal motion of said plunger within said suction cavity along said axis.

5. The system according to claim 4, wherein said internal motor divides said suction cavity into two sub-cavities, wherein a volume of a cavity that is distal to the pipe is larger than volume of a cavity that is proximal to the pipe.

6. The system according to claim 1, wherein said inlet port and said inlet port valve are at a distal end of said tubular encapsulation, and said connection port and said connection port valve is at a proximal end of said tubular encapsulation.

7. The system according to claim 1, wherein said inlet port and said inlet port valve are at a proximal end of said tubular encapsulation, and said connection port and said connection port valve is at a distal end of said tubular encapsulation.

8. The system according to claim 7, wherein the system further comprises an inlet port and a respective inlet port valve at said proximal end, and a connection port and a respective connection port valve at said distal end, said inlet port and said connection port valves being arranged to provide double action pumping.

9. The system according to claim 8, wherein said inlet port valve at said proximal end and said connection port valve at said distal end are constituted to open when said plunger moves toward said distal end, and wherein said inlet port valve at said distal end and said connection port valve at said proximal end are constituted to open when said plunger moves toward said proximal end.

10. The system according to claim 1, wherein the system comprises sealing packs, mounted on said plunger to separate between said plunger and liquid in said cavity.

11. The system according to claim 1, further comprising a solar energy harvesting system for powering said reciprocal motion of said plunger, and an energy storage device for storing energy harvested by said solar energy harvesting system.

12. The system according to claim 11, wherein the system comprises a controller having a circuit configured for measuring an amount of energy stored in said energy storage device, and for releasing energy from said energy storage device to power said reciprocal motion of said plunger when said amount of energy is above a predetermined threshold.

13. The system according to claim 12, wherein said controller is configured to reduce an amount of energy released from said energy storage device when an amount energy harvested by said solar energy harvesting system is below a predetermined threshold.

14. The system according to claim 1, wherein the system comprises a controller for controlling power supply to said reciprocal motion of said plunger, said controller being configured to reverse a motion direction of said plunger before said plunger completes a full stroke length.

15. The system according to claim 1, wherein the system comprises a controller for controlling power supply to said reciprocal motion of said plunger, said controller being configured to temporarily reduce said power supply before said plunger completes a full stroke length.

16. The system according to claim 15, wherein said controller is configured to dynamically vary a point at which said power supply is temporarily reduced.

17. The system according to claim 16, wherein said controller comprises a circuit configured to determine a position and an average speed of said plunger, and is configured to repeat said dynamically variation until said average speed, at a predetermined position of said stroke, is below a predetermined threshold.

18. The system according to claim 17, wherein said controller is configured to reverse a motion direction of said plunger if said average speed, at said predetermined position of said stroke, is not below said predetermined threshold.

19. A valve system comprising a valve body and a movable sealing member, said valve body being formed with an inlet port controlled by said sealing member, and an outlet port which is not controlled by said sealing member, wherein said inlet port is radial with respect to said valve body, wherein said outlet port is axial with respect to said valve body, and wherein said sealing member comprises a diaphragm.

* * * * *